United States Patent
Brignall et al.

[11] Patent Number: 6,055,727
[45] Date of Patent: May 2, 2000

[54] INLET PORT WITH SHARP EDGE SWIRL LIP

[75] Inventors: Allan Brignall, Chelmsford; Philip Baker, London; Paul Turner, Chelmsford, all of United Kingdom

[73] Assignee: Ford Global Technologies, Inc., Dearborn, Mich.

[21] Appl. No.: 09/218,468

[22] Filed: Dec. 22, 1998

[30] Foreign Application Priority Data

Dec. 24, 1997 [GB] United Kingdom .................... 9727175

[51] Int. Cl.[7] .............................. F02B 31/04; B23P 15/00
[52] U.S. Cl. ........................................ 29/888.06; 123/306
[58] Field of Search ............................ 123/188.14, 193.5, 123/306, 308; 29/888.06, 888.4

[56] References Cited

U.S. PATENT DOCUMENTS

| | | | |
|---|---|---|---|
| 4,207,854 | 6/1980 | Alford et al. ........................ | 123/188.14 |
| 4,366,787 | 1/1983 | Gale ................................. | 123/188.14 |
| 4,433,651 | 2/1984 | Nakakita et al. .................... | 123/306 X |

*Primary Examiner*—Tony M. Argenbright
*Attorney, Agent, or Firm*—Jerome R. Drouillard

[57] ABSTRACT

A cylinder head for an internal combustion engine includes a helical inlet port with a sharp edge swirl lip on a generally cylindrical valve stem recess. The helical inlet port has an inlet passage, a bowl-shaped chamber which has a rim that terminates in an annular valve seat and which encompasses an annular space about a generally cylindrical valve stem guide for a poppet valve stem. One surface of the bowl meets one wall of the inlet passage along a swirl edge, which has a radius of less than about 0.5 mm, and preferably a sharp edge with a radius of less than about 0.1 mm. Such swirl edges may be formed by casting the inlet port with excess material, which is then machined away only within the bowl along a cylindrical cutting line.

9 Claims, 4 Drawing Sheets

INLET PORT WITH SHARP EDGE SWIRL LIP

FIELD OF THE INVENTION

The present invention relates to a cylinder head for an internal combustion engine of the reciprocating piston type, and in particular to a helical inlet port with a sharp edge swirl lip on a generally cylindrical valve stem recess.

DESCRIPTION OF THE PRIOR ART

Helical inlet ports are commonly used to generate swirl in the gasses entering the cylinder of an internal combustion engine, for example in a direct injection diesel engine. The port has an inverted bowl-shaped recess or chamber, the rim of which terminates in an annular valve seat. A generally cylindrical valve guide, for the stem of a poppet valve, depends from the roof of the bowl. The bowl is defined by an annular space which extends around the valve guide and which is intercepted, usually tangentially, by the inlet port, in order to generate swirl in the intake gasses as these are admitted to the cylinder.

The junction between the upstream inlet port and the annular space about the cylindrical valve guide is smooth along an outer wall of the port, and has a cusp shape along an opposite inner wall. Such a conventional cusp will generally have an edge or lip with a radius of more than 1.5 mm and more usually at least about 3 mm. For example, iron can typically be cast with features having a radius of no less than about 3 mm, and aluminium alloys can typically be cast with features having a radius of no less than about 1.5 mm. The cusp acts as a swirl edge, with most of the edge being directed parallel, or within 10° of parallel, to the axis of the valve guide.

The degree of swirl is dependent on the particular shapes of the walls inside the helical port. Ideally, these shapes should be constant for each cylinder head produced in a production run, in order to ensure the same swirl in each cylinder head. For example, fuel injection equipment is set to deliver a fuel at a certain pressure and droplet size, and for convenience and economy this setting is the same for each engine produced. If the swirl characteristics vary between different cylinder heads, or between different inlet ports in the same cylinder head, then fuel may not be dispersed correctly with the inlet gasses or may settle on surfaces inside the cylinder, such as the combustion bowl piston. This will result in non-optimal combustion and increased emissions. Therefore, swirl ratio is best at a particular nominal value for a particular fuel injection setting.

However, in practice it is difficult to maintain uniformity of the inlet port features in production of a cast cylinder head because the tools, or "boxes" as they are sometimes called, tend to be abraded by sand blown into the tools. In addition, the granularity and low strength of the packed sand released from the tool limits the minimum radius on the swirl edge, and can cause variations in the radius of this edge. The shape of the swirl edge can therefore change over time.

As a consequence, in order to optimise fully emission performance, it would necessary, particularly with direct injection diesel or gasoline engines, either to tune each engine individually to meet performance targets, or to attempt to measure the shape of the swirl edge, and to reject cylinder heads that were out of specification. Since this is time consuming and relatively expensive, it has hitherto often been necessary to settle for lower performance on at least some of the engines produced, and hence higher certifiable emissions. It would therefore be desirable to provide an inlet port which may be produced with less variation in the shape of the swirl edge.

SUMMARY OF THE INVENTION

Accordingly, the present invention provides a cast metal cylinder head for an internal combustion engine of the reciprocating piston type comprising a helical inlet port with an inlet passage, a bowl-shaped chamber which has a rim that terminates in an annular valve seat and which encompasses an annular space about a generally cylindrical valve stem guide for a poppet valve stem, a surface of the bowl meeting one wall of the inlet passage along a swirl edge. The surface of the bowl adjacent the swirl edge is a processed surface and that a surface of the inlet passage upstream and adjacent the swirl edge is a cast surface.

The head can thus be formed in a casting process with an excess of material inside the bowl adjacent the swirl edge, which excess material is subsequently removed by processes such as machining or grinding in subsequent processing of the head.

Preferably, at least some of the swirl edge has a radius of less than about 0.5 mm. The advantage of a relatively sharper swirl edge is that for a given percentage variation in the radius, there will be a correspondingly smaller variation the magnitude of the swirl generated by the helical port. Therefore, in general it is preferred if the swirl edge has a radius of less than 0.5 mm over the whole, or substantially the whole, of the swirl edge so as to minimise any variations owing to a larger radius portion of the swirl edge.

In a preferred embodiment, the swirl edge is a sharp edge, that is an edge with a radius of about 0.1 mm or less. It would be, however, very difficult or impossible to produce such a sharp a swirl edge using a conventional casting process.

During production of the cylinder head, before the valve stems are in place, access may readily be had to the inside of the bowl-shaped swirl chamber or recess. The inlet passage upstream of the swirl edge is less accessible through the valve seat opening, and in some cases may be accessed only with difficulty from the upstream end of the inlet passage. Therefore, it is preferred if only the side of the swirl edge inside the bowl-shaped chamber is cast with excess material and then machined. The surfaces in the inlet passage upstream of the swirl edge may then remain as originally cast.

The surface of the bowl adjacent to the swirl edge preferably presents a concave surface along the annular space, for example a surface conforming generally to the essentially cylindrical shape of this portion of the bowl-shaped chamber. Such a surface may readily be produced with a rotating cutting tool. The surface may, however, be concave in orthogonal directions, that is, somewhat hollow.

A sharp edge swirl lip as described above has the advantage that each helical inlet port may be produced with a radius that is close to a nominal radius in terms of the degree of swirl generated by the helical port. Processing of the surface inside the bowl adjacent the edge may, however, introduce other variations in the shape of the port. For example, one swirl edge may be machined further away from the valve stem axis than a swirl edge in another inlet port. If the inlet passage surface upstream and adjacent the swirl edge is a curved surface, then machining of the opposite surface in the bowl-shaped chamber may result in different orientations of the surfaces immediately upstream and adjacent the swirl edges. Therefore, it is preferred if the surface of the inlet passage upstream and adjacent the swirl edge has a flat portion. Then, if processing or machining of the surface adjacent the swirl edge inside the bowl cuts away part of this flat surface, the orientation relative to the valve stem axis of the inlet passage surface upstream and adjacent the swirl edge will be unchanged.

Also according to the invention, there is provided a method of manufacturing a cylinder head for an internal combustion engine of the reciprocating piston type, the cylinder head comprising a helical inlet port with an inlet passage, a bowl-shaped chamber which has a rim that terminates in an annular valve seat and which encompasses an annular space about a generally cylindrical valve stem guide for a poppet valve stem, a surface of the bowl meeting one wall of the inlet passage along a swirl edge. The method includes the steps of casting the cylinder head with an excess of material inside the bowl adjacent the swirl edge and without an excess of material along the inlet passage upstream and adjacent the swirl edge. Thereafter, the head is processed to remove the excess material and so sharpen the swirl edge.

The processing may, for example, be by machining of the excess material. A swirl edge may then be generated which is sharper than that achievable by conventional casting techniques, having, for example, a radius less than 0.5 mm, and preferably less than about 0.1 mm.

As described above, the first step may involve casting of a flat surface along the inlet passage upstream and adjacent the swirl edge.

BRIEF DESCRIPTION OF THE DRAWINGS

The invention will now be described in more detail, by way of example and with reference to the accompanying drawings, in which.

DETAILED DESCRIPTION OF THE PREFERRED EMBODIMENTS

Figure 1:
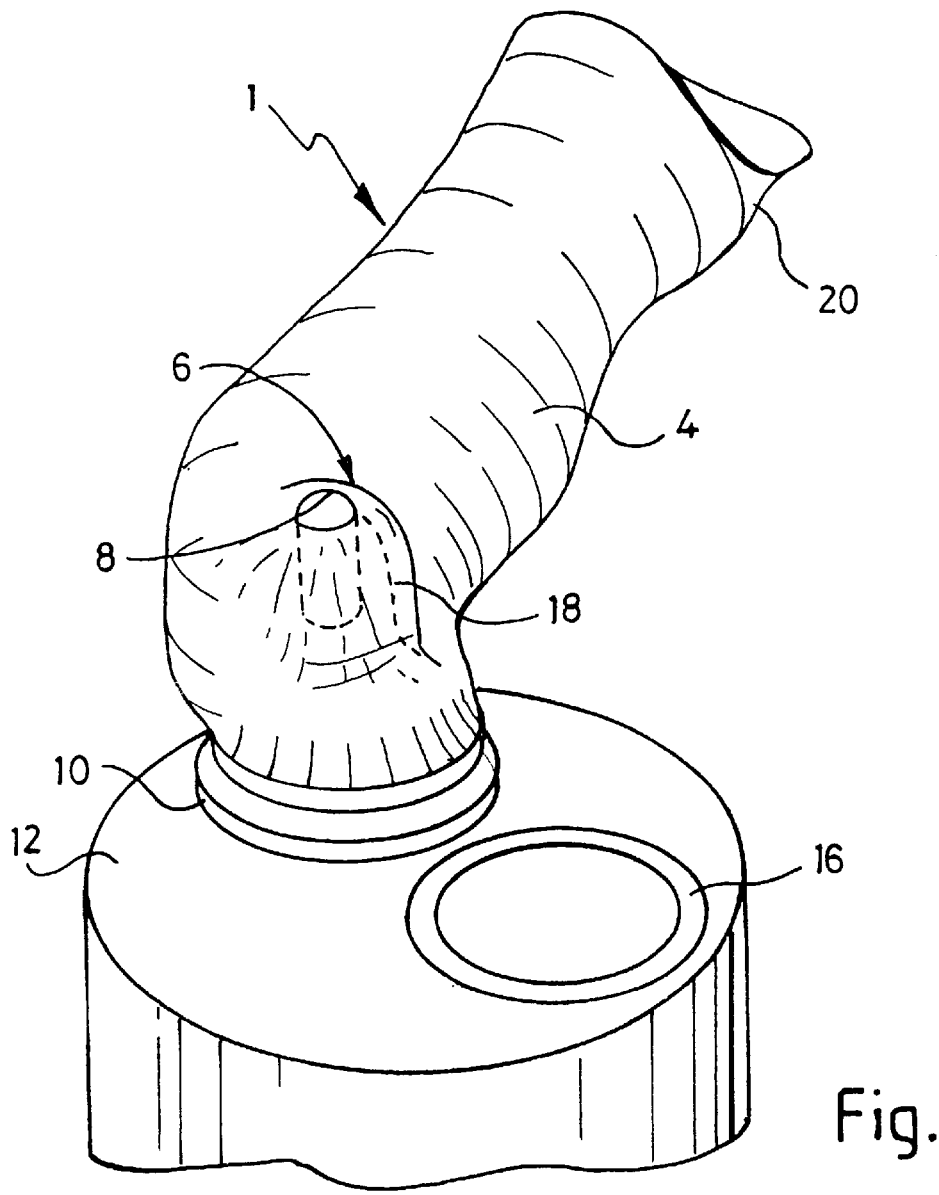
FIG. 1 is a perspective view of the internal surfaces of a helical inlet port in a cylinder head according to the invention, the port having an inverted bowl-shaped chamber around a generally cylindrical valve stem guide above an inlet valve seat.
Figure 2:
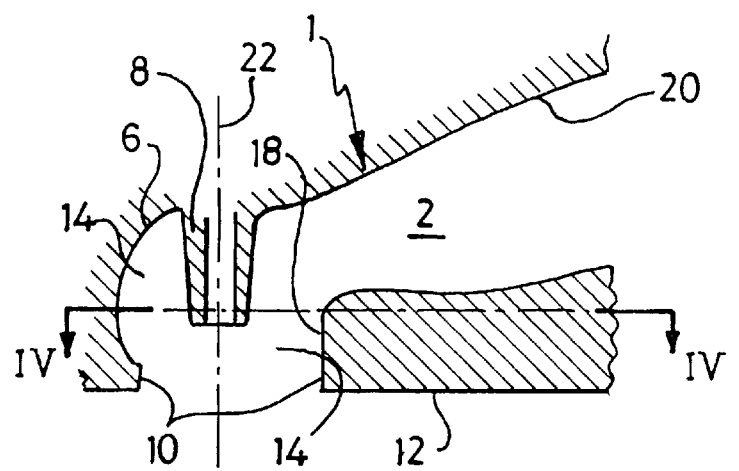
FIG. 2 is a cross section through the cylinder head of FIG. 1, in a vertical plane through the valve stem axis.
Figure 3:
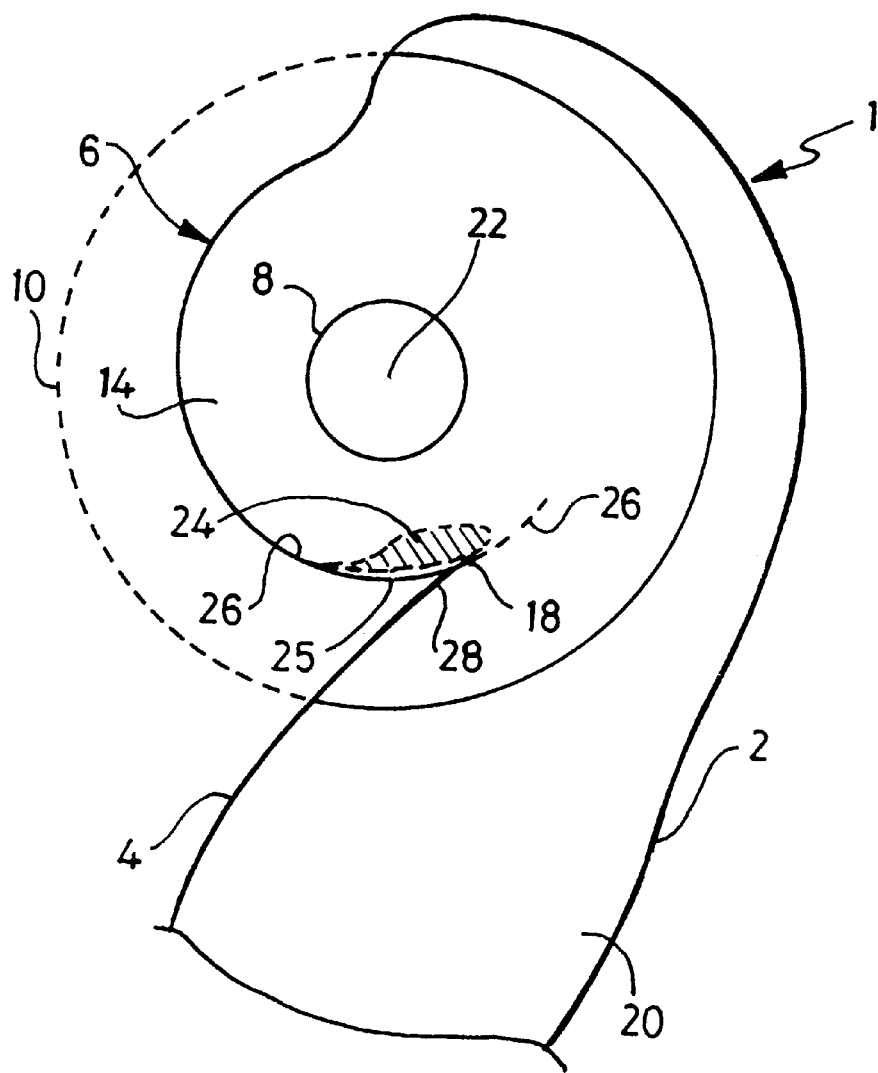
FIG. 3 is a cross section through the cylinder head of FIG. 1, at right angles to the valve stem axis looking down on the inlet valve seat and showing a wall of the bowl meeting an upstream portion of the inlet passage at a swirl edge.

FIGS. 1, 2 and 3 show the internal surfaces of a helical inlet port 1 in a cylinder head cast in iron or an aluminium alloy. The inlet port 1 has a valve stem recess with an inverted bowl-shaped surface 6 that extends about a valve stem guide 8 which is directed downwardly toward an inlet valve seat 10 in a lower surface 12 of the cylinder head. An annular space 14 extends around most of the valve stem guide 8, broken by an inlet passage 20 which meets the bowl 6 essentially tangentially. For clarity in the drawings, no poppet valve is shown, and no outlet port is shown leading from the cylinder's outlet valve seat 16. One skilled in the art readily appreciates the relationship of these non-illustrated components to the illustrations.

As best illustrated in FIG. 3, a first surface 2 of the inlet passage 20 blends in smoothly with the bowl-shaped recess, while an opposite inner surface 4 of the inlet passage 20 meets the bowl-shaped recess at swirl edge 18. The swirl edge 18 has a cusp-shaped cross section, and is substantially straight over most of its length, shown as a dashed line in FIG. 1. The straight portion of the swirl edge is directed about 5° from parallel with an axis 22 of the valve stem, tapering outwardly slightly towards the lower end of the swirl edge 18.

The swirl edge 18 of a preferred embodiment is sharp, with a radius less than 0.1 mm. Using conventional casting processes, it is not possible to cast such a sharp thin-walled feature, owing to the granularity and consistency of sands used in casting. As best shown in FIG. 3, a preferred embodiment forms the swirl edge 18 by initially casting the swirl edge 18 with excess material 24 (shown hatched) adjacent the swirl edge 18 along the side of the swirl edge directed toward the annular space 14 about the valve stem guide 8. The excess material 24 results in a swirl edge initially having a conventional radius, i.e. approximately 1.5 mm to 3 mm, depending on the metal and casting techniques employed.

After the cylinder head 1 is so cast, a rotating metal cutting tool (not illustrated) is inserted through the annular valve seat opening 10 into the annular space 14. The cutting tool is then used to cut away the excess material 24 along a cylindrical cutting line 26 which intersects with a preferably substantially flat surface 28 upstream and immediately adjacent the swirl edge 18. This cutting operation yields a cylindrical surface 25 which terminates in a sharp point along the swirl edge, that is, a point with a radius preferably less than 0.1 mm. The axis of the cut 26 is generally parallel with the valve stem axis 22. The orientation of the preferably flat surface 28 may be roughly tangential to a circle centered on the valve stem axis 22, as illustrated in FIG. 3. However, other designs of helical inlet port have the surface upstream of the swirl edge directed more towards, or even at, the valve stem axis, and one skilled in the art appreciates that the present invention is applicable to these orientations as well.

Figure 4:
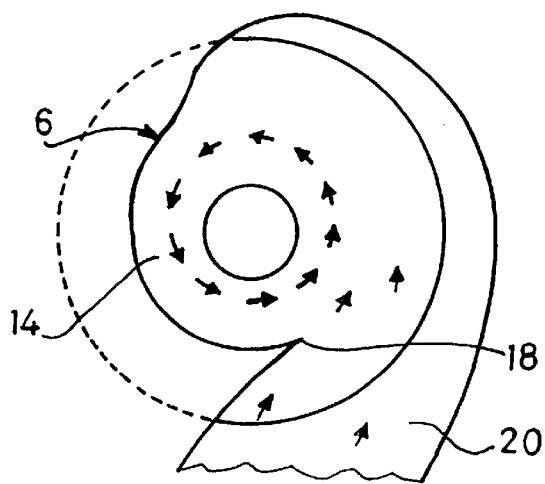
FIGS. 4 to 7 are four cross sections similar to FIG. 3, showing qualitatively the effect that variation in swirl edge radius has on air flow, in which FIGS. 5 to 7 have conventional swirl edge radii.
Figure 5:
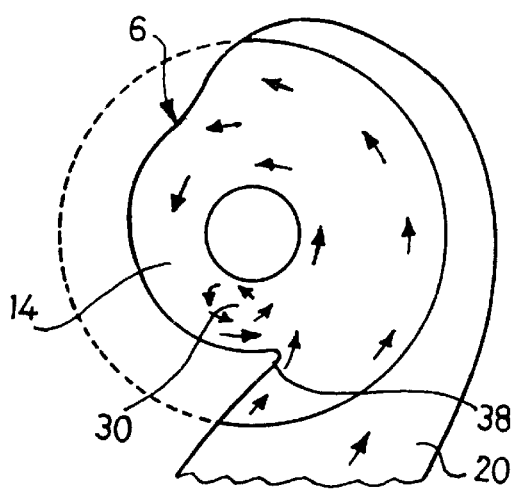
Figure 6:
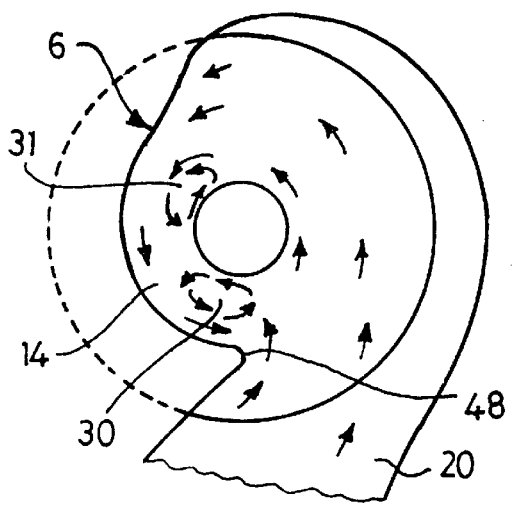
Figure 7:
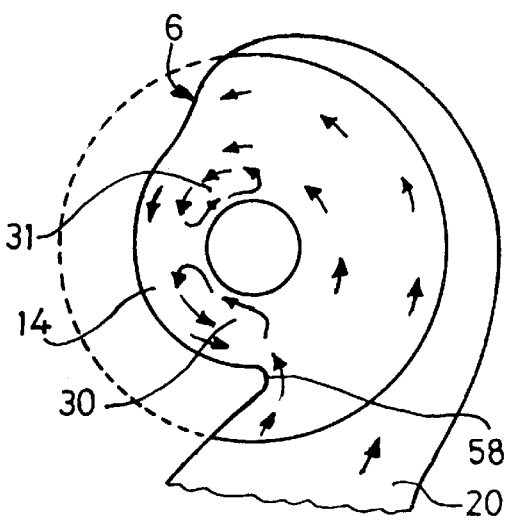

FIGS. 4 to 7 help to illustrate the beneficial effect of having a sharp swirl edge. Each of these Figures is based on numerical model calculations, and shows in qualitative terms the airflow pattern as indicated by arrows inside the inlet port passage 20 and bowl-shaped chamber 6. FIG. 4 corresponds with FIG. 3, having a sharp swirl edge 18. FIGS. 5 to 7 show conventional swirl edges 38,48,58 with a radii of, respectively, 2.5 mm, 3.0 mm and 3.5 mm. Such a variation may happen between cylinder heads in a production line casting process, for example owing to variations in filling of the casting along the swirl edge, or the effect over time of abrasion of the tool from sand blown into the tool as described above.

It is readily appreciated from these Figures that a rounded swirl edge causes air to be pulled at least partially around the swirl edge, creating at least one eddy 30,31 inside the annular space 14. Such eddies 30,31 cause turbulence and reduce the swirl effect of the gasses entering the cylinder. The eddies 30,31 may be compensated by controlling other variables affecting combustion, for example fuel injection timing and droplet size, to achieve adequate combustion. However, a problem arises from the fact that the strength and effect of the eddies 30,31 varies significantly depending on the swirl edge radius, and one particular setting of fuel combustion parameters will not suit all swirl edge radii. As a result, emissions performance may not be optimal for all cylinders or for all cylinder heads.

Because the machined swirl edge 18 is sharp, the airflow upstream of the swirl edge remains laminar as this airflow meets the airflow around the valve stem guide 8, and there are no eddies. Each swirl edge can therefore be made to conform to a nominal performance in terms of the swirl generated by the helical inlet port.

Figure 8:
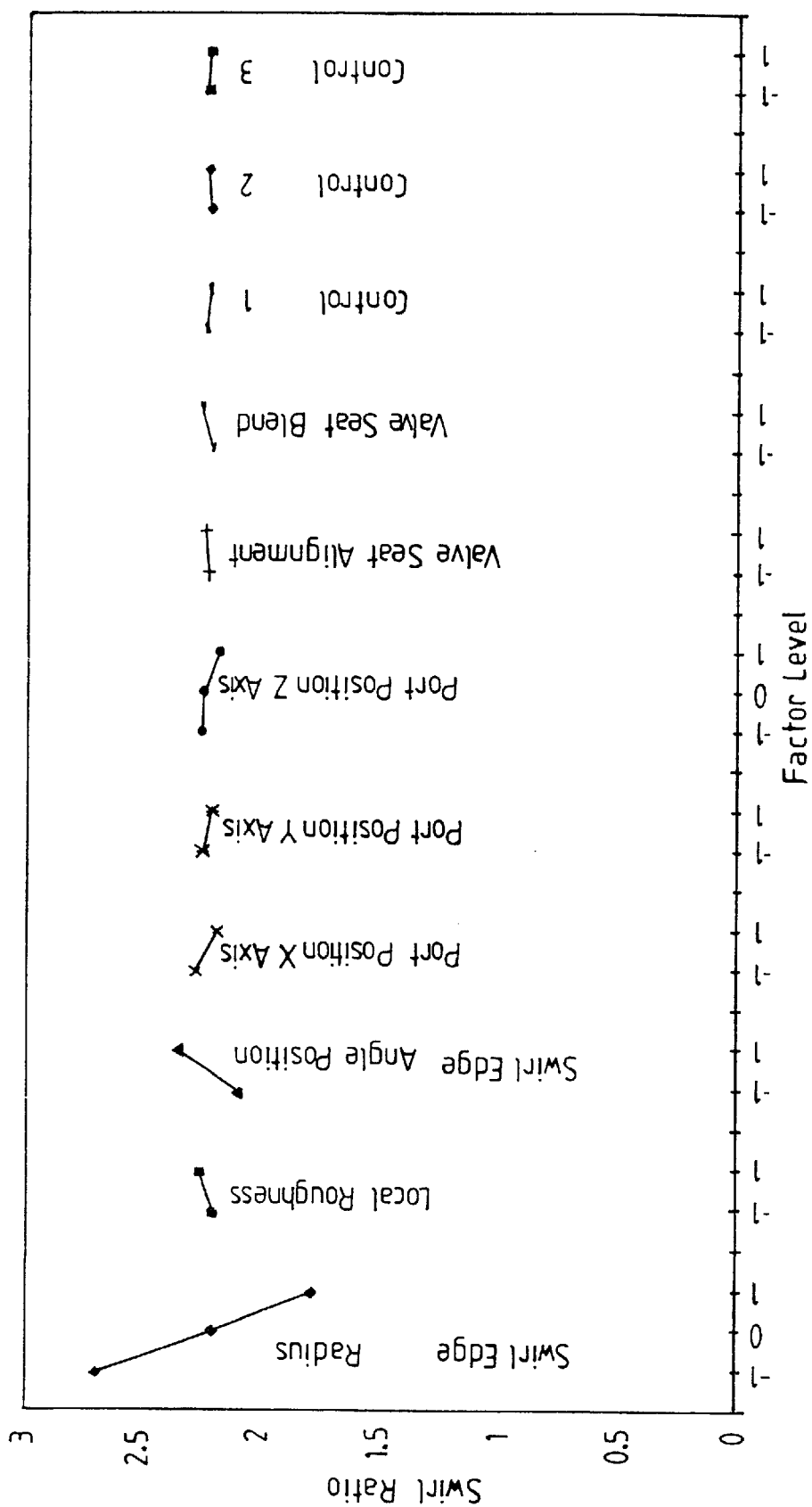
FIG. 8 is a plot showing the sensitivity of swirl as a function of a number of inlet port shape parameters.

FIG. 8 is a sensitivity effect analysis plot of swirl ratio against a number of port shape parameters. Swirl ratio here is measured using a well-known technique on a test rig, in which air is sucked into an empty cylinder inside of which a vane anemometer is mounted. The vane is designed to detect the swirl of air about the cylinder axis and so rotates on pivots about this axis. The swirl ratio is calculated as the ratio of the rotation rate of the vane divided by a notional engine rotation rate being that consistent with the volume of air entering the cylinder. Therefore, the greater the swirl ratio, the greater the swirl imparted to air drawn into the cylinder by the helical inlet port.

The plot has a set of two or three data points for each of eight shape factors, all of which apart from "valve blend" were varied independently of the other shape factors over the normal distribution range expected in a casting production process. There are also three sets of data points taken for no variation in the port shape, in order to estimate the inherent accuracy of the measurements (Control 1, 2,3,). From this it can be seen that of the eight shape parameters, five have an effect which is indistinguishable, or slightly more, than the experimental error. These five include the x, y and z axis variability of the port position with respect to the cylinder axis (where x and y are at right angles to the cylinder axis and z is parallel to the cylinder axis); the variability of valve seat alignment (in the y-direction at right angles to the engine axis); and valve seat blend (the two data points are a smooth junction, and a stepped junction, between the valve seat and port inner wall).

One parameter, roughness inside the bowl-shaped chamber, had a moderate effect on the degree of swirl.

Two parameters were discovered to have a significant effect. "Lip angle position" is the angle the wall 4, adjacent and upstream of the swirl edge, makes with the valve stem axis, in the plane of FIG. 3. Surprisingly, it was discovered that "swirl edge radius" has a much greater effect than either inlet port roughness or lip angle position. This effect is due to variable turbulence induced by eddies, and while a constant degree of turbulence would be acceptable, in practice turbulence can vary strongly on relatively small changes in inlet port shape, as evidenced due to conventional casting processes. The sharp swirl edge of the present invention permits a smooth laminar transition between the airflows entering and swirling around the valve stem axis.

Another benefit of smooth laminar flow, when a portion of the exhaust gasses are recirculated with inlet gasses, is that this can help prevent the accumulation of carbon and other residues of combustion on inlet port surfaces, since such residues will tend to deposit in areas of stagnant flow.

In a preferred embodiment, the swirl edge has a radius of less than about 0.1 mm. In an alternative embodiment, significant benefits are achieved with a swirl edge having a radius less than about 0.5 mm. Similarly, a preferred swirl edge has the sharp edge extending over the full length of the straight portion of the swirl edge. In an alternative embodiment, swirl variability is reduced by using a sharp swirl edge that extends over substantially most of the straight portion of the swirl edge.

In a preferred embodiment, the swirl edge is machined to a sharp radius. This method thereby controls the most significant variable affecting the degree of swirl. The surface that is machined is also readily accessible through the valve seat opening, and the machined surface may conveniently have a cylindrical shape, generally concentric with the valve stem axis, that is readily produced by a rotating cutting tool. It is therefore possible in a production environment to reduce significantly variation in the swirl ratio between different inlet ports by removing a relatively small amount of excess metal. The present invention therefore allows a significant improvement in the variability in the degree of swirl between different inlet ports.

Although the preferred embodiments of the present invention have been described, it will be apparent to a person skilled in the art that variations may be made to the assembly that is described herein without departing from the scope of the invention as defined in the following claims.

What is claimed is:

1. A method of manufacturing a cylinder head for an internal combustion engine of the reciprocating piston type, the cylinder head comprising a helical inlet port with an inlet passage having a wall at one end thereof, a bowl-shaped chamber in fluid communication with the inlet passage, said chamber having an internal surface meeting said wall of the inlet passage along a swirl edge formed thereby, the method comprising the steps of:

casting of the cylinder head with an excess material inside the bowl adjacent the swirl edge and without an excess of material along the inlet passage upstream and adjacent the swirl edge; and processing the head to remove the excess material and thereby so sharpen the swirl edge.

2. A method as claimed in claim 1, wherein the processing step comprises a machining process.

3. A method as claimed in claim 2, wherein the casting step comprises casting a substantially flat surface along the inlet passage upstream and adjacent the swirl edge.

4. A method as claimed in claim 1, wherein the chamber encompasses an annular space about a generally cylindrical valve stem guide for a poppet valve stem, the method further comprising said processing step producing a swirl edge having a concave surface along the annular space.

5. A method as claimed in claim 3, wherein the chamber encompasses an annular space about a generally cylindrical valve stem guide for a poppet valve stem, the method further comprising said processing step producing a swirl edge having a concave surface along the annular space.

6. A method as claimed in claims 1, wherein the processing step produces a radius on the swirl edge having a radius of less than about 0.5 mm.

7. A method as claimed in claims 5, wherein the processing step produces a radius on the swirl edge having a radius of less than about 0.5 mm.

8. A method as claimed in claim 1, wherein the processing step produces a sharp edge along the swirl edge.

9. A method as claimed in claim 7, wherein the processing step produces a sharp edge along the swirl edge.

* * * * *